United States Patent
Suzuki et al.

(10) Patent No.: US 10,086,842 B2
(45) Date of Patent: Oct. 2, 2018

(54) ROAD SURFACE CONDITION ESTIMATION DEVICE

(71) Applicant: DENSO CORPORATION, Kariya, Aichi-pref. (JP)

(72) Inventors: Youichirou Suzuki, Nishio (JP); Akira Takaoka, Nishio (JP); Takashi Saitou, Nishio (JP); Nobuya Watabe, Kariya (JP); Masashi Mori, Kariya (JP); Takatoshi Sekizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 75 days.

(21) Appl. No.: 15/122,227

(22) PCT Filed: Mar. 12, 2015

(86) PCT No.: PCT/JP2015/001395
§ 371 (c)(1),
(2) Date: Aug. 29, 2016

(87) PCT Pub. No.: WO2015/141200
PCT Pub. Date: Sep. 24, 2015

(65) Prior Publication Data
US 2016/0368502 A1     Dec. 22, 2016

(30) Foreign Application Priority Data
Mar. 18, 2014   (JP) ................. 2014-054930

(51) Int. Cl.
| | |
|---|---|
| *B60W 40/06* | (2012.01) |
| *B60C 19/00* | (2006.01) |
| *B60W 40/068* | (2012.01) |
| *G01M 17/02* | (2006.01) |

(52) U.S. Cl.
CPC ............. *B60W 40/06* (2013.01); *B60C 19/00* (2013.01); *B60W 40/068* (2013.01);
(Continued)

(58) Field of Classification Search
CPC ............... B60W 40/06; B60W 40/068; B60W 2530/20; B60W 2520/26; G01M 17/025; B60C 19/00
See application file for complete search history.

(56) References Cited

U.S. PATENT DOCUMENTS

| | | | |
|---|---|---|---|
| 2002/0162389 A1* | 11/2002 | Yokota | ............... B60C 23/06 73/146 |
| 2007/0222569 A1* | 9/2007 | Beranger | ............ B60C 23/0408 340/447 |

(Continued)

FOREIGN PATENT DOCUMENTS

| | | |
|---|---|---|
| JP | 2005306160 A | 11/2005 |
| JP | 2007099245 A | 4/2007 |

(Continued)

OTHER PUBLICATIONS

"Bridgestone Announces New Tire Technology for Determining Road Surface Conditions based on the concept of CAIS", Sep. 13, 2011, URL: http://www.bridgestone.com/corporate/news/2011091301.html.

(Continued)

*Primary Examiner* — Peter Macchiarolo
*Assistant Examiner* — Xin Zhong
(74) *Attorney, Agent, or Firm* — Harness, Dickey & Pierce, P.L.C.

(57) ABSTRACT

A road surface condition estimation device includes a tire side device and a vehicle side device. The tire side device includes a vibration detection unit outputting a detection signal indicating a tire vibration magnitude, a signal processing unit, and a transmitter. The signal processing unit extracts a ground contact duration during which a portion of the tread corresponding to an arrangement position of the vibration detection unit is in contact with a ground, calculates a high frequency component level of the detection signal detected during the ground contact duration, counts cumulative rotation number of the tire, and corrects the level of the high frequency component based on the cumulative rotation number of the tire. The transmitter transmits corrected level of the high frequency component as road surface condition data. The vehicle side device estimates a road surface condition of the travelling road based on the received road surface condition data.

3 Claims, 6 Drawing Sheets

(52) U.S. Cl.
CPC ...... *G01M 17/025* (2013.01); *B60W 2520/26* (2013.01); *B60W 2530/20* (2013.01)

(56) References Cited

U.S. PATENT DOCUMENTS

| | | | |
|---|---|---|---|
| 2009/0105921 A1* | 4/2009 | Hanatsuka | B60G 17/0165 701/80 |
| 2013/0116972 A1 | 5/2013 | Hanatsuka et al. | |
| 2016/0031273 A1 | 2/2016 | Suzuki et al. | |

FOREIGN PATENT DOCUMENTS

| | | | |
|---|---|---|---|
| JP | 2007249964 A | 9/2007 |
| JP | 2011242303 A | 12/2011 |
| WO | WO-2014141690 A1 | 9/2014 |
| WO | WO-2015141199 A1 | 9/2015 |

OTHER PUBLICATIONS

"Bridgestone Corporation wins the « 2012 Tire Technology of the Year Award » with CAIS Technology", Feb. 23, 2012, URL: http://www.bridgestonenewsroom.eu/stroies/6334-bridgestone-corporation-wins-the-2012-tire-technology-of-the-year-award-with-cais-technology.

"Road Surface Estimation Technology of Bridgestone: Detecting 7 Types of Road Surface Including Icy Road and Wet Road by Attaching Acceleration Sensor to Tire", Automotive Technology 2012.1, pp. 29, 31.

* cited by examiner

ROAD SURFACE CONDITION ESTIMATION DEVICE

CROSS REFERENCE TO RELATED APPLICATIONS

This application is a U.S. National Phase Application under 35 U.S.C. 371 of International Application No. PCT/JP2015/001395 filed on Mar. 12, 2015 and published in Japanese as WO 2015/141200 A1 on Sep. 24, 2015. This application is based on and claims the benefit of priority from Japanese Patent Application No. 2014-054930 filed on Mar. 18, 2014. The entire disclosures of all of the above applications are incorporated herein by reference.

TECHNICAL FIELD

The present disclosure relates to a road surface condition estimation device that estimates a road surface condition on the basis of vibrations applied to the tires of a vehicle.

BACKGROUND ART

Up to now, a technique in which an acceleration sensor is buried in a back surface of a tire tread, and a road surface condition, for example, an asphalt road, a snowy road, or a frozen road, is estimated on the basis of a detection signal of the acceleration sensor has been proposed (for example, refer to Patent Literature 1). Specifically, in the case where the acceleration sensor is buried in the back surface of the tire tread, when a portion corresponding to a location in which the acceleration sensor is disposed in the tire tread contacts a road surface in association with the rotation of the tire, a vibration component corresponding to the road surface condition is superimposed on a detection signal of the acceleration sensor. For that reason, up to now, a frequency component of the vibration acquired when the tire portion corresponding to the portion in which the acceleration sensor is disposed in the tire tread contacts the road surface is analyzed to estimate the road surface condition.

However, when a tire wear occurs, the road surface condition cannot be accurately estimated by merely performing the frequency analysis of vibration applied to the tire. For example, a decrease in a friction coefficient between the tire and the road surface can be detected on the basis of an increase of high frequency component superimposed on the detection signal during a road contact duration. Herein, the road contact duration is a duration while a part of the tire is in contact with the road surface. The tire wear also causes an increase of the high frequency component. That is, both the tire wear and travelling on a low μ road surface may cause the increase of high frequency component. Herein, low μ road is a road whose road surface friction coefficient (hereinafter referred to as "μ") is small. Thus, a factor causing the increase of high frequency component is difficult to be determined when a tire wear occurs.

PRIOR ART LITERATURE

Patent Literature

Patent Literature 1: JP 2011-242303 A

SUMMARY OF INVENTION

In view of the foregoing difficulties, it is an object of the present disclosure to provide a road surface condition estimation device capable of estimating a road surface condition with a higher accuracy in consideration of tire wear.

According to an aspect of the present disclosure, a road surface condition estimation device includes a tire side device and a vehicle side device. The tire side device includes a vibration detection unit, a signal processing unit, and a transmitter. The vibration detection unit is attached to a back surface of a tread of a tire provided to a vehicle, and outputs a detection signal corresponding to a magnitude of a vibration of the tire. The signal processing unit includes a ground contact duration extraction unit, a high frequency level calculation unit, a rotation number count unit, and a level correction unit. The ground contact duration extraction unit extracts a ground contact duration during which a portion of the tread corresponding to an arrangement position of the vibration detection unit is in contact with a ground within one rotation of the tire. The high frequency level calculation unit calculates a level of a high frequency component of the detection signal detected during the ground contact duration. The rotation number count unit counts a cumulative rotation number of the tire. The level correction unit corrects the level of the high frequency component based on the cumulative rotation number of the tire. The transmitter transmits the level of the high frequency component, which is corrected by the level correction unit, as road surface condition data indicative of a road surface condition of a travelling road. The vehicle side device includes a receiver receiving the road surface condition data transmitted from the transmitter, and a road surface condition estimation unit estimating the road surface condition of the travelling road based on the road surface condition data.

In the road surface condition estimation device configured as described above, the level of the high frequency component is corrected according to a wear state of the tire in the tire side device, and the corrected level of the high frequency component is transmitted to the vehicle side device as the road surface condition data. For this reason, whether the factor causing the level of the high frequency component to become higher resides in the travelling on the low μ road surface or the tire wear can be identified, and incorrect estimation of the road surface condition caused by the tire wear can be restricted. Therefore, with the above-described road surface condition estimation device, the road surface condition can be estimated with a higher accuracy in consideration of the tire wear.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Embodiments of the present disclosure will be described below with reference to the accompanying drawings. In the following embodiments, parts identical with or equivalent to each other are denoted by the same symbol for description convenience.

First Embodiment

A road surface condition estimation device according to the present embodiment will be described with reference to FIGS. 1 to 5. The road surface condition estimation device according to the present embodiment is used to estimate a road surface condition during a traveling on the basis of vibration applied to a ground contact surface of a tire provided in each wheel of a vehicle.

Figure 1:
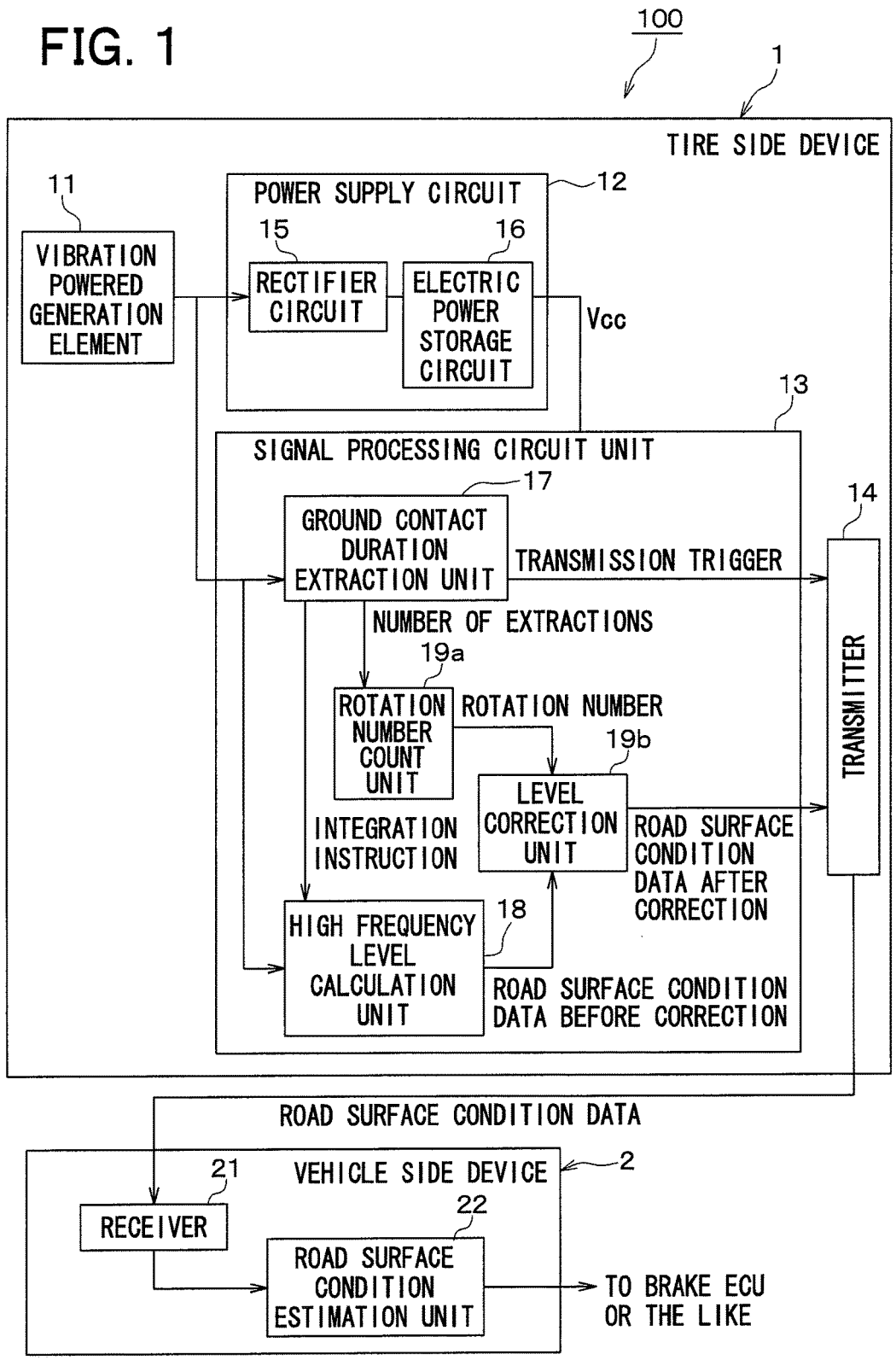
FIG. 1 is a diagram illustrating an overall block configuration of a road surface condition estimation device according to a first embodiment of the present disclosure.

As illustrated in FIG. 1, a road surface condition estimation device 100 includes a tire side device 1 disposed on a tire side and a vehicle side device 2 disposed on a vehicle body side. In the road surface condition estimation device 100, the tire side device 1 transmits data indicative of a road surface condition of a travelling road to the vehicle side device 2 and the vehicle side device 2 receives the data transmitted from the tire side device 1. The vehicle side device 2 estimates the road surface condition of the traveling road on the basis of the received data. The following will describe a configuration of the tire side device 1 and the vehicle side device 2 in detail.

Figure 2:
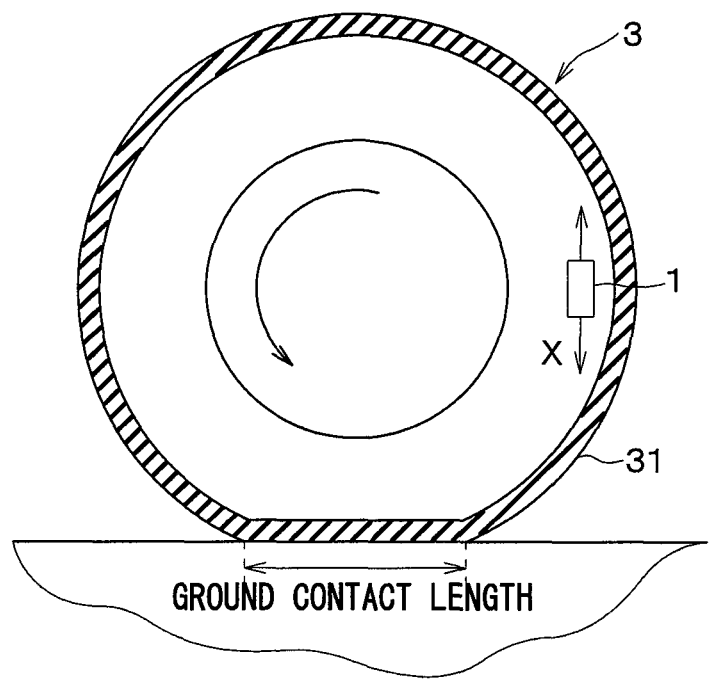
FIG. 2 is a diagram showing a schematic cross-sectional view of a tire to which a tire side device is attached.

As illustrated in FIG. 1, the tire side device 1 includes a vibration powered generation element 11, a power supply circuit 12, a signal processing circuit unit 13, and a transmitter 14. As illustrated in FIG. 2, the tire side device 1 is disposed on a back surface side of a tread 31 of a tire 3.

The vibration powered generation element 11 functions as a vibration detection unit that outputs a detection signal corresponding to vibration in a tire tangential direction (a direction indicated by an arrow X in FIG. 2). The tire tangential direction is a direction of a tangent line of a circular orbit along which the tire side device 1 rotates in accordance with a rotation of the tire 3. In the present embodiment, the vibration powered generation element 11 outputs the detection signal corresponding to the vibration in the tire tangential direction, and converts a vibration energy into an electric energy, and supplies power to the tire side device 1 using the electric energy. For this reason, the vibration powered generation element 11 is disposed so that electric power can be generated from the vibration of the vibration powered generation element 11 in the tire tangential direction. For example, an electrostatic induction power generation element (electret), a piezoelectric element, a friction element, a magnetostrictive element, or an electromagnetic induction element can be used as the vibration powered generation element 11. When only the detection signal corresponding to the vibration in the tire tangential direction needs to be output without considering an intended purpose for power generation, an acceleration sensor of different type may also be used.

For example, suppose that the electrostatic induction power generation element is used as the vibration powered generation element 11. In this case, when an upper electrode to be positively charged by electrostatic induction vibrates in a horizontal direction with respect to a lower electrode having negative charges, static charges caused by the electrostatic induction are varied, and an electromotive force is produced to generate a power. As described above, the vibration powered generation element 11 generates the power and supplies the generated power to the tire side device 1 so that the tire side device 1 detects a signal corresponding to the magnitude of vibration in the tire tangential direction is generated.

When the vehicle equipped with the road surface condition estimation device 100 travels on a road, the tread 31 of the tire 3 vibrates due to various factors such as a rotational movement of the tire 3 and unevenness of a road surface. When the vibration is transferred to the vibration powered generation element 11, the vibration powered generation element 11 generates power based on the vibration and generated power is transferred to the power supply circuit 12 to provide power supply to the tire side device 1. An output voltage of the vibration powered generation element 11 during the power generation changes according to the magnitude of vibration. Thus, the output voltage of the vibration powered generation element 11 is also transmitted to the signal processing circuit unit 13 as a detection signal indicative of the magnitude of vibration in the tire tangential direction. The output voltage of the vibration powered generation element 11 is an AC voltage since generated based on the reciprocating movement of the upper electrode corresponding to the vibration.

The power supply circuit 12 stores electricity on the basis of the output voltage of the vibration powered generation element 11 to generate the power, and supplies the power to the signal processing circuit unit 13 and the transmitter 14. The power supply circuit 12 includes a rectifier circuit 15 and an electric power storage circuit 16.

The rectifier circuit 15 is a known circuit that converts the AC voltage output from the vibration powered generation element 11 into a DC voltage. The AC voltage output from the vibration powered generation element 11 is converted into a DC voltage by the rectifier circuit 15, and is output to the electric power storage circuit 16. The rectifier circuit 15 may be configured by a full-wave rectifier circuit or a half-wave rectifier circuit.

The electric power storage circuit 16 stores the DC voltage applied from the rectifier circuit 15, and is configured by a capacitor. The output voltage of the vibration powered generation element 11 is stored in the electric power storage circuit 16 through the rectifier circuit 15, and with the stored voltage as a power source, the power is supplied to the signal processing circuit unit 13 or the transmitter 14 included in the tire side device 1. With the provision of the electric power storage circuit 16 in the power supply circuit 12, when the vibration powered generation element 11 excessively generates the power, the electric power storage circuit 16 stores an excessive power, and when the amount of power generation is insufficient, the power supply circuit 12 compensates the insufficient power with the stored power.

The signal processing circuit unit 13 corresponds to a signal processing unit, uses the output voltage of the vibration powered generation element 11 as a detection signal indicative of vibration data in the tire tangential direction, processes the detection signal to obtain data indicative of the road surface condition, and transmits the data indicative of the road surface condition to the transmitter 14. In other words, the signal processing circuit unit 13 extracts a ground contact duration of the vibration powered generation element 11. The ground contact duration of the vibration powered generation element 11 is a period of time during which a portion corresponding to an arrangement position of the vibration powered generation element 11 in the tread 31 of the tire 3 is in contact with the road surface. The ground contact duration is extracted from one rotation cycle of the tire 3 on the basis of the output voltage of the vibration powered generation element 11 which changes over time. Since a high frequency component included in the detection signal detected during the ground contact duration of the vibration powered generation element 11 represents the road surface condition, the signal processing circuit unit 13 extracts the high frequency component, and generates data indicative of the road surface condition on the basis of the extracted high frequency component, and transmits the data indicative of the road surface condition to the transmitter 14.

Specifically, the signal processing circuit unit 13 includes a well-known microcomputer having various circuits, a CPU, a ROM, a RAM, and an I/O, and performs the above process on the basis of the output voltage of the vibration powered generation element 11. The signal processing circuit unit 13 includes, as functional portions for performing those processing, a ground contact duration extraction unit 17, a high frequency level calculation unit 18, a rotation number count unit 19a, and a level correction unit 19b.

The ground contact duration extraction unit 17 detects a peak value of the detection signal represented by the output voltage of the vibration powered generation element 11, extracts the ground contact duration of the vibration powered generation element 11 based on the peak value, and transmits, to the high frequency level calculation unit 18, an information indicating that the vibration powered generation element 11 is in the ground contact duration. The ground contact duration extraction unit 17 controls the transmitter 14 to generate a transmission trigger for transmitting a calculation result of the high frequency level calculation unit 18 to the vehicle side device 2 as road surface condition data indicative of the road surface condition. Hereinafter, a function of the ground contact duration extraction unit 17 will be described in detail.

Figure 3:
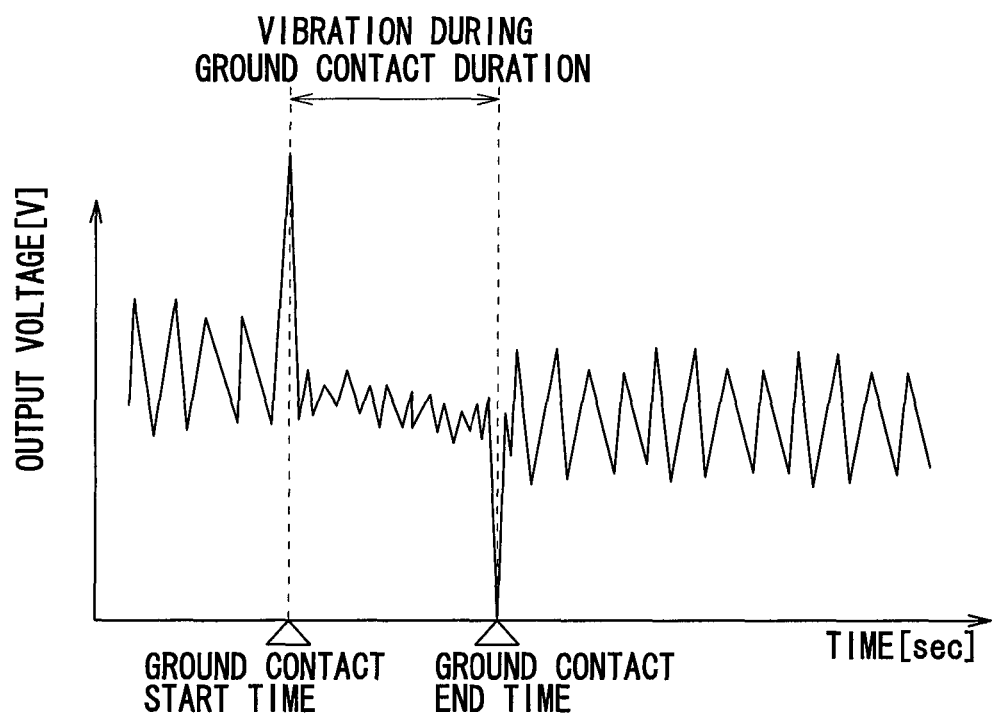
FIG. 3 is a voltage waveform diagram showing an output voltage of a vibration powered generation element during tire rotation.

A waveform of the output voltage (unit: V) of the vibration powered generation element 11 during tire rotation is, for example, illustrated in FIG. 3. As illustrated in the figure, at the time of a ground contact start when a portion of the tread 31 corresponding to the arrangement position of the vibration powered generation element 11 starts to contact the ground by the rotation of the tire 3, the output voltage of the vibration powered generation element 11 becomes a maximum value. The ground contact duration extraction unit 17 detects a time point corresponding to a first peak value when the output voltage of the vibration powered generation element 11 becomes the maximum value as the ground contact start time. Further, as illustrated in FIG. 3, at the time of a ground contact end when contact states changes from a state in which the portion of the tread 31 corresponding to the arrangement position of the vibration powered generation element 11 contacts the ground to a state in which the portion does separates from the ground by the rotation of the tire 3, the output voltage of the vibration powered generation element 11 becomes a minimum value. The ground contact duration extraction unit 17 detects a time point corresponding to a second peak value when the output voltage of the vibration powered generation element 11 becomes the minimum value as the ground contact end time.

The reason why the vibration powered generation element 11 obtains the peak values at the above-described time points will be described below. That is, when the portion of the tread 31 corresponding to the arrangement position of the vibration powered generation element 11 contacts the ground by the rotation of the tire 3, a portion of the tire 3 in the vicinity of the vibration powered generation element 11 is pressed against the road surface by the rotation of the tire 3, and a shape of the portion is deformed from a substantially cylindrical shape to a planar shape as shown in FIG. 2. Upon receiving an impact at the time of the deformation, the output voltage of the vibration powered generation element 11 increases to the first peak value. When the portion of the tread 31 corresponding to the arrangement position of the vibration powered generation element 11 is separated from the ground surface from the contacted state by the rotation of the tire 3, the portion of the tread 31 of the tire 3 is released from pressure from the road surface and returns to the substantially cylindrical shape from the planar shape in the vicinity of the vibration powered generation element 11. Upon receiving the impact when returning the shape of the tire 3 to the original, the output voltage of the vibration powered generation element 11 decreases to the second peak value. As described above, the first and second peak values are obtained when the vibration powered generation element 11 starts to contact the ground and separates from the ground. Because a direction of the impact when the tire 3 is pressed is opposite to a direction of the impact when the tire 3 is released from pressing, signs of the output voltage are also opposite to each other.

The ground contact duration extraction unit 17 transmits the time points of the first and second peak values to the high frequency level calculation unit 18, and issues an instruction for rectifying and integrating the high frequency component included in the output voltage of the vibration powered generation element 11 within a time period from the time point of the first peak value to the time point of the second peak value. As described above, the ground contact duration extraction unit 17 extracts the ground contact duration of the vibration powered generation element 11, and transmits information indicating that the vibration powered generation element 11 is in the ground contact duration to the high frequency level calculation unit 18.

In order that the time point when the output voltage of the vibration powered generation element 11 becomes the second peak value is set to the ground contact end time of the vibration powered generation element 11, the ground contact duration extraction unit 17 transmits a transmission trigger to the transmitter 14 at the time when the output voltage becomes the second peak value. As a result, the transmitter 14 transmits the calculation result transmitted from the high frequency level calculation unit 18 as the road surface condition data. Herein, the calculation result transmitted from the high frequency level calculation unit 18 is a result corrected by the level correction unit 19*b*. In this configuration, instead of continuous data transmission, the transmitter 14 transmits the data only at the ground contact end time of the vibration powered generation element 11. Thus, the power consumption in the transmitter 14 can be reduced.

Upon receiving the information indicating that the vibration powered generation element 11 is in the ground contact duration, from the ground contact duration extraction unit 17, the high frequency level calculation unit 18 calculates the level of the high frequency component caused by the vibration of the tire 3 included in the output voltage of the vibration powered generation element 11 during the ground contact duration. The high frequency level calculation unit 18 transmits the calculation result to the to the level correction unit 19*b*, and then transmits the corrected calculation result corrected by the level correction unit 19*b* to the transmitter 14 as road surface condition data indicative of the road surface condition. The high frequency level calculation unit 18 calculates the level of the high frequency component as an index indicative of the road surface condition. The reason why the level of the high frequency component is used as an index indicative of the road surface condition will be described with reference to FIGS. 4A, 4B, and 5.

Figure 4A:
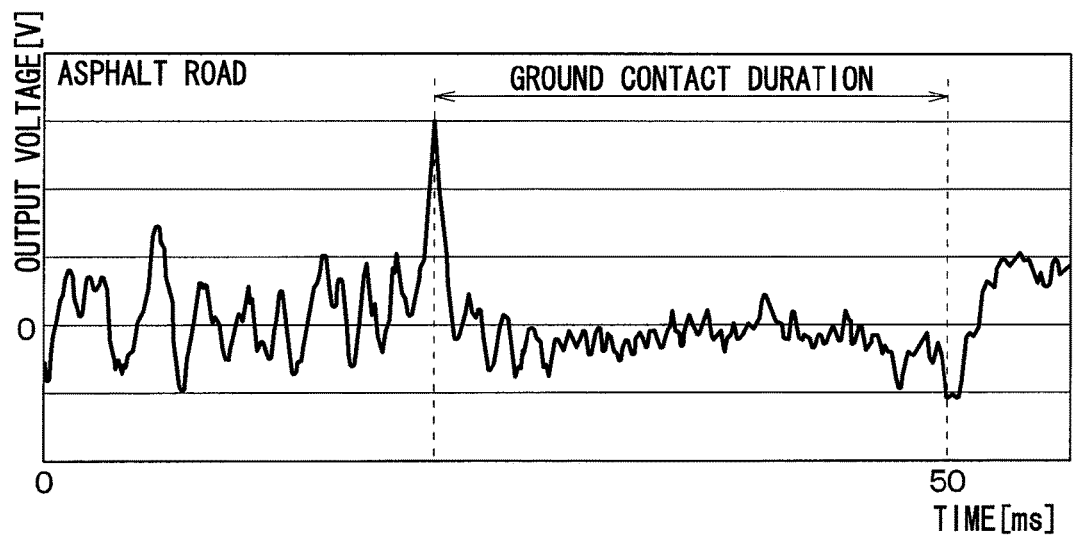
FIG. 4A is a graph showing a change in output voltage of the vibration powered generation element when traveling on a high μ road surface whose road surface friction coefficient (hereinafter friction coefficient is referred to as μ) is relatively large such as an asphalt road.
Figure 4B:
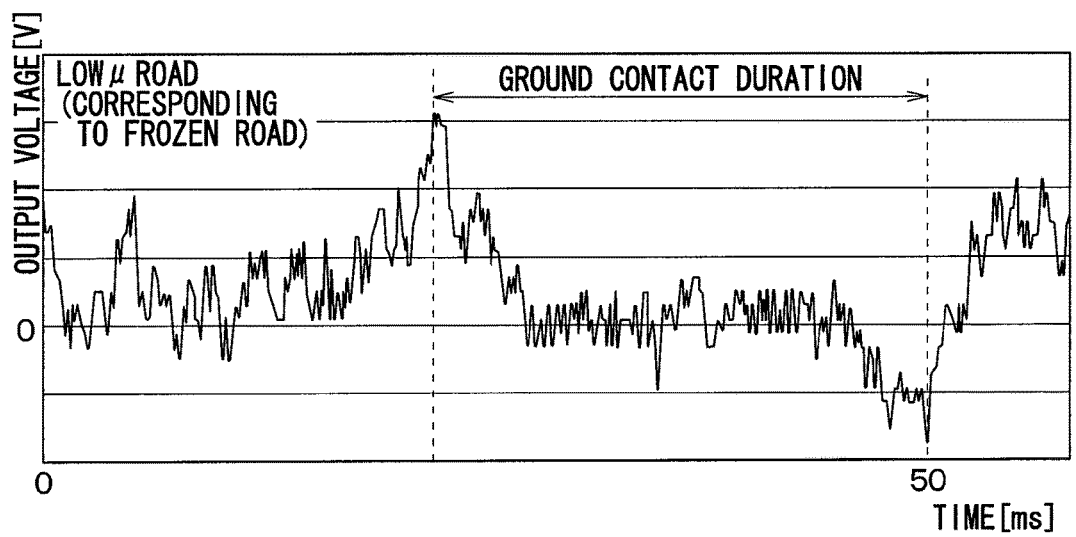
FIG. 4B is a graph showing a change in the output voltage of the vibration powered generation element when traveling on a low μ road surface whose road surface μ is relatively small such as a frozen road.

FIG. 4A shows a change in the output voltage (unit: V) of the vibration powered generation element 11 when traveling on a high μ road surface whose road surface μ is relatively large such as an asphalt road. FIG. 4B shows a change in the output voltage (unit: V) of the vibration powered generation element 11 when traveling on a low μ road surface whose road surface μ is relatively small such as a frozen road.

Figure 5:
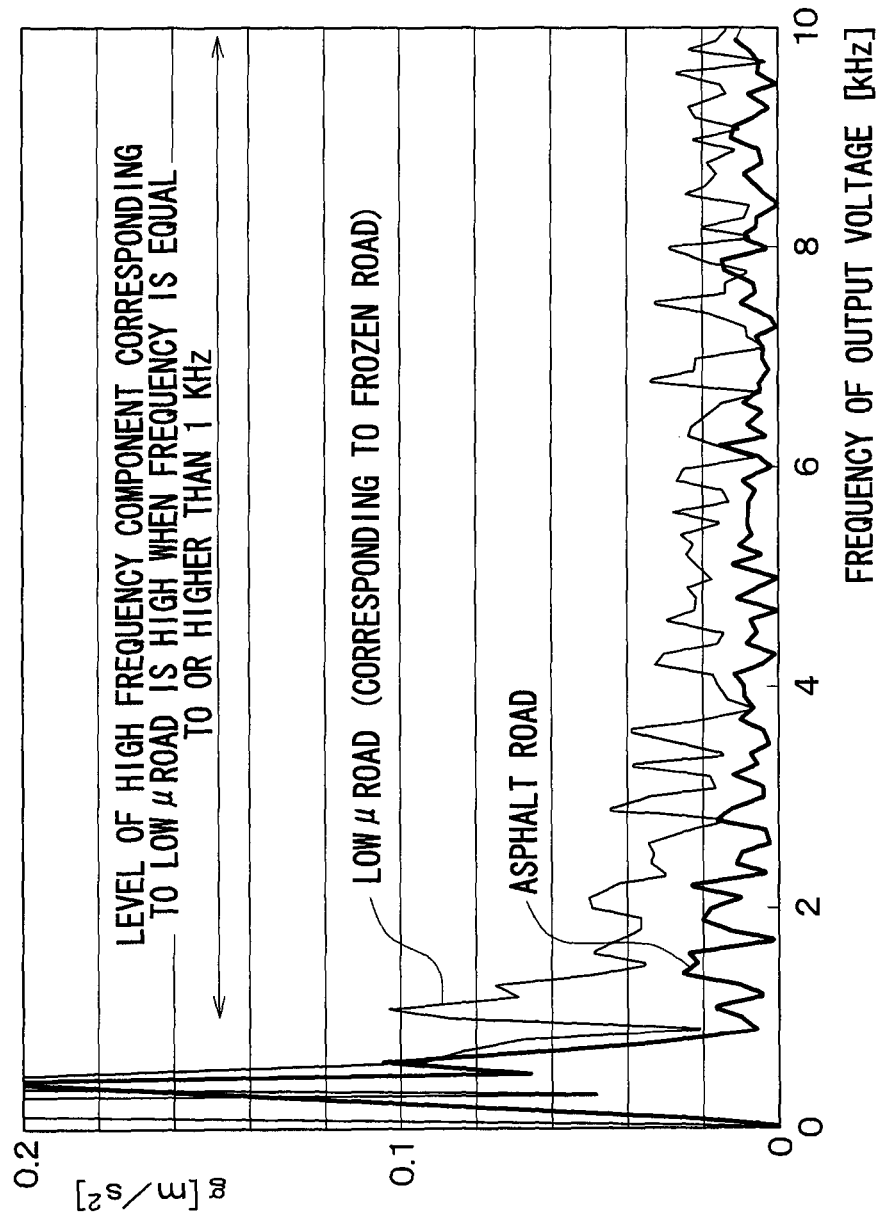
FIG. 5 is a graph showing a frequency analysis result of an output voltage detected while the vehicle travels on a high μ road surface and a specific portion of the tire is in contact with the road surface and a frequency analysis result of an output voltage detected while the vehicle travels on a low μ road surface and the specific portion of the tire is in contact with the road surface.

As is understood from those figures, although the road surface μ are different, the first and second peak values appear at the beginning and the end of the ground contact duration, that is, at the ground contact start time and the ground contact end time of the vibration powered generation element 11. When the vehicle travels on the low μ road surface, fine high frequency vibration caused by slip of the tire 3 is superimposed on the output voltage due to an influence of the road surface μ. For that reason, in the case of traveling on the high μ road surface and the case of traveling on the low μ road surface, when the frequency analysis of the output voltage in the ground contact duration is performed, results illustrated in FIG. 5 are obtained. As shown in FIG. 5, within a low frequency band, high levels are obtained when traveling on the high μ road and on the low μ road. Within a high frequency band of 1 kHz or higher, the level when traveling on the low μ road is higher than the level when traveling on the high μ road. For that reason, the level of the high frequency component of the output voltage of the vibration powered generation element 11 can serve as an index indicative of the road surface condition.

Therefore, the level of the high frequency component of the output voltage of the vibration powered generation element 11 during the ground contact duration is calculated by the high frequency level calculation unit 18, and the calculated level can be set as the road surface condition data. For example, the high frequency component may be extracted from the output voltage of the vibration powered generation element, and a part of the high frequency component corresponding to the ground contact duration may be integrated as the level of the high frequency component.

Figure 6:
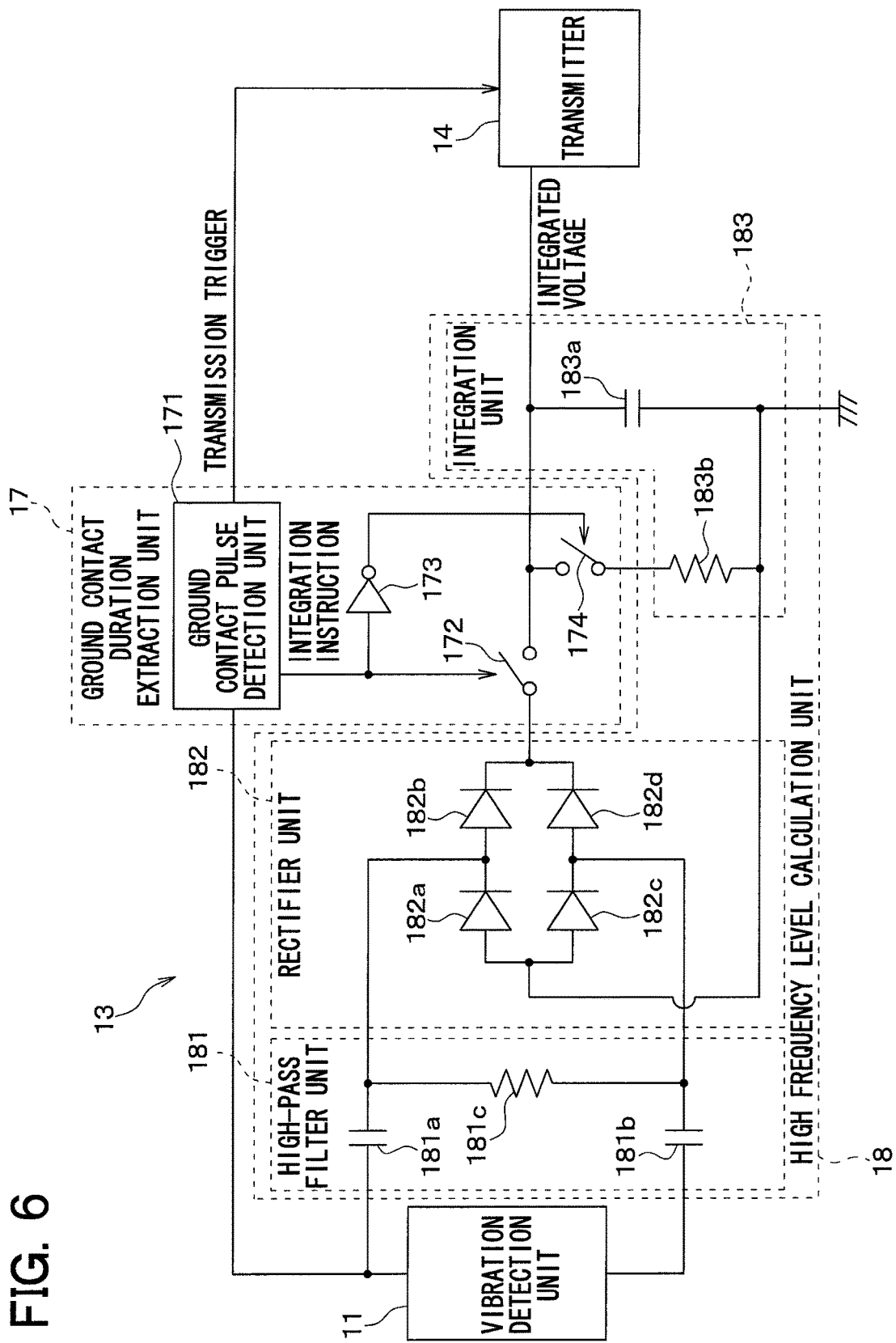
FIG. 6 is a diagram illustrating a specific circuit configuration of a signal processing circuit unit when a level of high frequency components is calculated by integration of the high frequency components extracted while the specific portion of the tire is in contact with the road surface.

FIG. 6 is a diagram illustrating a specific circuit configuration of the signal processing circuit unit 13 which is applied in calculation of the level of the high frequency component using integration method. In this method, the high frequency component extracted during the ground contact duration is integrated to obtain the level of the high frequency component.

Referring to FIG. 6, the ground contact duration extraction unit 17 receives the detection signal (output voltage) of the vibration powered generation element 11, and outputs an integration instruction signal to the high frequency level calculation unit 18 while outputting the transmission trigger to the transmitter 14 on the basis of the analysis result of the detection signal.

Specifically, the ground contact duration extraction unit 17 includes a ground contact pulse detection unit 171. The ground contact pulse detection unit 171 detects the peak of the detection signal at the time when the vibration powered generation element 11 contacts the ground, and detects the peak of the detection signal at the time when the vibration powered generation element 11 separates from the ground. The ground contact pulse detection unit 171 outputs the integration instruction signal at the time point when the detection signal of the vibration powered generation element 11 reaches the first peak value, and cancels the integration instruction signal at the time point when the detection signal reaches the second peak value. In the present embodiment, when a high level is output as the integration instruction signal from the ground contact pulse detection unit 171, a switch 172 turns on by the high level signal. Further, the high level is inverted by an inverter 173 and the inverted low level turns off a switch 174. When the switch 172 is turned on and the switch 174 is turned off, the integration of the high frequency component starts. In response to a cancellation of the integration instruction signal, the output of the ground contact pulse detection unit 171 becomes low level. Thus, the switch 172 turns off. Further, the low level from the ground contact pulse detection unit 171 is inverted by the inverter 173, and the inverted high level turns on the switch 174. When the switch 172 is turned off and the switch 174 is turned on, the integration of the high frequency component is terminated.

The high frequency level calculation unit 18 includes a high-pass filter unit 181, a rectifier unit 182, and an integration unit 183.

The high-pass filter unit 181 corresponds to a high frequency component extraction unit that extracts the high frequency component from the detection signal of the vibration powered generation element 11. The high-pass filter unit 181 includes a CR filter circuit having capacitors 181*a*, 181*b*, and a resistor 181*c*, and passes only the high frequency component of the detection signal of the vibration powered generation element 11 by adjusting a capacitance value of the capacitors 181*a* and 181*b*, and a resistance value of the resistor 181*c*.

The rectifier unit 182 includes a full-wave rectifier circuit having diodes 182*a* to 182*d* arranged in a bridge shape, and performs full-wave rectification to the high frequency component of the detection signal extracted by the high-pass filter unit 181. As a result, only a positive voltage that has been treated by the full-wave rectification is applied to the integration unit 183.

The integration unit 183 integrates the high frequency component of the detection signal of the vibration powered generation element 11. In the present embodiment, the integration unit 183 includes a capacitor 183*a* and a resistor 183*b*.

The capacitor 183*a* is charged on the basis of the high frequency component that has been treated by the full-wave rectification. A charging voltage of the capacitor 183*a* corresponds to a value obtained by integrating the high frequency component, and an integrated voltage value of the capacitor 183a is input to the transmitter 14 as data indicative of the road surface condition. In other words, as illustrated in FIG. 5, since the level of the high frequency component of the detection signal of the vibration powered generation element 11 is different between a case where the travel road surface is the low μ road surface and a case where the travel road surface is the high μ road surface, the integrated voltage value of the capacitor 183a is changed according to the road surface condition.

Figure 7:
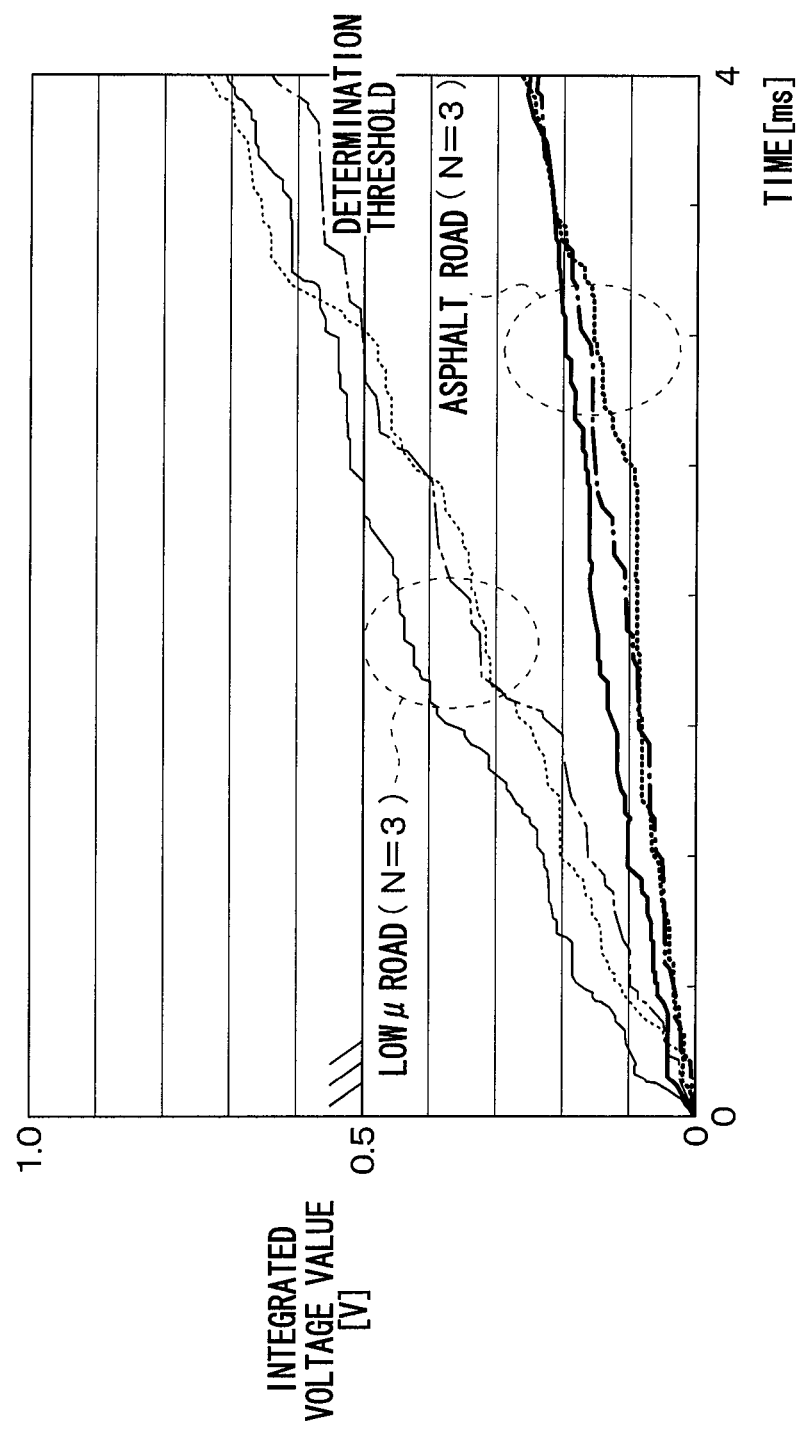
FIG. 7 is a graph showing a charging of a capacitor in a case where the travelling road surface is the low μ road surface and in a case where the travelling road surface is the high μ road surface.

FIG. 7 shows a charging state of the capacitor 183a in each of the case where the travel road surface is the low μ road surface, and the case where the travel road surface is the high μ road surface (asphalt road). In each case, the charging operation is carried out by three times (the number of charging operation N=3). As illustrated in the figure, when the travel road surface is the low μ road surface, the level of the high frequency component of the detection signal of the vibration powered generation element 11 is larger than the level of the high frequency component corresponding to the high μ road surface. Thus, the integrated voltage value of the capacitor 183a corresponding to the low μ road surface is greater than the integrated voltage value of the capacitor 183a corresponding to the high μ road surface. As described above, because the magnitude of the integrated voltage value of the capacitor 183a is varied according to the road surface condition, the integrated voltage value of the capacitor 183a is used as the data indicative of the road surface condition.

When the ground contact pulse detection unit 171 cancels the integration instruction signal and the switch 174 turns on, the resistor 183b is connected to the capacitor 183a to discharge the capacitor 183a. As a result, a charge voltage of the capacitor 183a is reset to 0 for the next integration of the high frequency component.

The signal processing circuit unit 13 can be configured by the above-described circuit, and the high frequency component of the output voltage of the vibration powered generation element 11 is integrated by the integration unit 183 to calculate the level of the high frequency component detected during the ground contact duration.

The rotation number count unit 19a counts the tire rotation number. Usually, the tire wear occurs corresponding to the frequency of use. Thus, the tire rotation number becomes a parameter indicative of the tire wear. For this reason, the rotation number count unit 19a counts the tire rotation number that is a parameter indicative of a tire wear state. For example, since the ground contact duration is extracted for each tire rotation cycle and the total extraction number of the ground contact duration extracted by the ground contact duration extraction unit 17 is equal to the tire rotation number, each extraction of the ground contact duration may accumulated to count the tire rotation number. Alternatively, the pulse number of the detection signals detected by the vibration power generation element 11 may be accumulated to count the tire rotation number. That is, the tire rotation number can be accumulated each time the detection signal becomes the first peak value or becomes the second peak value to count the tire rotation number.

The level correction unit 19b corrects the calculation result in the high frequency level calculation unit 18. Specifically, the level correction unit 19b corrects the integrated voltage value of the high frequency component according to the tire wear state to obtain the integrated voltage value which is corrected in consideration of the tire wear. Then, the level correction unit 19b transmits the corrected integrated voltage value to the transmitter 14 as the road surface condition data. Specifically, a friction coefficient between the tire 3 and the road surface decreases with deterioration of tire wear state, and the frequency component of the detection signal during the ground contact duration is higher in the worn tire compared with a tire without wear. For this reason, during the ground contact duration, the integrated voltage value of the worn tire calculated by the high frequency level calculation unit 18 is larger than the tire without wear. Therefore, the level correction unit 19b multiplies the integrated voltage value calculated by the high frequency level calculation unit 18 by a correction coefficient to correct the integrated voltage value. Herein, the correction coefficient is equal to or less than 1.

The correction coefficient may be set to a constant value, or may be preferably set to a variable value which changes according to the tire wear amount. A relationship between a gripping state and the tire wear state depends on the type of tire. Herein, the gripping state is a parameter indicating a gripping between the tire 3 and the road surface. Although the gripping is slightly different depending on the type of the tire 3, the gripping between the tire 3 and the road surface basically reduces with an increase of the tire wear amount. For this reason, the correction coefficient may be set to a variable value so that the correction coefficient is reduced with an increase of the accumulation count of the tire rotation number.

For example, the correction coefficient may be set to 1 until the accumulated count reaches a value corresponding to a warranty travel distance of the tire 3, and the correction coefficient may be set to a value less than 1 after the accumulated count exceeds the value corresponding to the warranty travel distance. Alternatively, the correction coefficient may be reduced with an increase of the accumulated count regardless of the warranty travel distance.

As described above, when the calculation result in the high frequency level calculation unit 18 is corrected according to the tire wear state by the level correction unit 19b, the corrected calculation result is transmitted to the transmitter 14 as the road surface condition data.

The transmitter 14 transmits the road surface condition data transmitted from the signal processing circuit unit 13 to the vehicle side device 2. A communication between the transmitter 14 and a receiver 21 provided in the vehicle side device 2 can be implemented by a known short-range wireless communication technique such as Bluetooth (registered trademark). The transmission time of the road surface condition data may be properly set. As described above, in the present embodiment, the transmission trigger is transmitted from the ground contact duration extraction unit 17 at the ground contact end time of the vibration powered generation element 11 to transmit the road surface condition data from the transmitter 14. In this configuration, instead of continuous data transmission, the transmitter 14 transmits the data only at the ground contact end time of the vibration powered generation element 11. Thus, the power consumption in the transmitter 14 can be reduced.

The road surface condition data can be transmitted together with predetermined identification information (ID information) of a wheel provided for each tire 3 equipped in the vehicle in advance. Since a position of each wheel can be identified by a known wheel position detection device for detecting any position of the vehicle to which the wheel is attached, the road surface condition data is transmitted to the vehicle side device 2 together with the ID information, thereby being capable of determining which wheel the data is related to. Normally, it is assumed that the road surface μ of the travel road surface is a constant value. However, there is a μ sprit road which has different road surface μ between right and left wheels of the vehicle, and in such a μ sprit road, the road surface condition data is preferably transmitted for each wheel. It is needless to say that the road surface condition is not estimated for each wheel, but multiple road surface condition data may be used as the estimation of the road surface condition such that a mean value of the integrated voltage value indicated by the road surface condition data transmitted from each wheel is used for the estimation of the road surface condition.

The vehicle side device 2 includes the receiver 21 and a road surface condition estimation unit 22. The road surface condition estimation unit 22 receives the road surface condition data transmitted from the tire side device 1, and performs various processing on the basis of the received data to detect the road surface condition of the traveling road.

The receiver 21 receives the road surface condition data transmitted by the tire side device 1. The road surface condition data received by the receiver 21 is sequentially output to the road surface condition estimation unit 22 each time the data is received.

The road surface condition estimation unit 22 includes a known microcomputer having a CPU, a ROM, a RAM, and an I/O, and performs processing for detecting the road surface condition according to a program stored in the ROM. Specifically, the road surface condition estimation unit 22 estimates the road surface μ on the basis of the magnitude of the integrated voltage value indicated by the road surface condition data. For example, the road surface condition estimation unit 22 may determine that the travel road surface is the low μ road surface when the integrated voltage value is larger than a determination threshold, and the travel road surface is the high μ road surface when the integrated voltage value is smaller than the determination threshold. The determination threshold may be set to an intermediate value between the integrated voltage value assumed when the travel road surface is the low μ road surface and the integrated voltage value assumed when the travel road surface is the high μ road surface, as illustrated in FIG. 7. For that reason, the road surface condition of the travel road surface can be estimated according to a comparison with the determination threshold.

When the road surface condition is estimated by the vehicle side device 2 as described above, the estimation result is communicated on, for example, a CAN (controller area network) (registered trademark) which is a vehicle network. The estimation result of the road surface condition is input to, for example, an electronic control unit for brake control (brake ECU), and used for setting an index when performing an antilock brake control, for example, a control start threshold in the antilock brake control.

As described above, according to the road surface condition estimation device 100 of the present embodiment, during the ground contact duration of the tire 3, the level of the high frequency component of the detection signal from the vibration powered generation element 11 is calculated in the tire side device 1, and the calculated level is transmitted as the road surface condition data. The road surface condition data is received by the vehicle side device 2 to estimate the road surface condition of the travel road surface. As a result, the road surface condition can be estimated without performing the frequency analysis. Thus, the power consumption can be reduced and the number of frequency analysis components can be reduced. Therefore, the manufacturing cost can be reduced.

In the tire side device 1, the level of the high frequency component is corrected according to the wear state of the tire 3, and the corrected level of the high frequency component is transmitted to the vehicle side device 2 as the road surface condition data. Thus, whether an increase of the level of the high frequency component is caused by the travelling on the low μ road surface or by the tire wear can be identified, and incorrect estimation of the road surface condition caused by the tire wear can be restricted. Therefore, the road surface condition estimation device 100 according to the present embodiment is capable of estimating the road surface condition with a higher accuracy in consideration of the tire wear.

In addition, in the signal processing circuit unit 13, after the detection signal of the vibration powered generation element 11 passes through the high-pass filter unit 181 and the high frequency component is extracted, the high frequency component is rectified, and then the capacitor 183a is charged till the ground contact end time of the vibration powered generation element 11 to obtain the integrated voltage value. In this configuration, because a portion of the signal processing circuit unit 13 except for the ground contact pulse detection unit 171 can be mainly configured by an analog circuit, signal processing can be performed with a low-cost space-saving circuit. In addition, because the tire side device 1 may transmit the integrated voltage value stored by the capacitor 183a as the road surface condition data, the amount of transmission data from the tire side device 1 to the vehicle side device 2 can be remarkably reduced, and the power consumption can be more effectively reduced. Therefore, the tire side device 1 can be downsized by the downsizing of the vibration powered generation element 11 provided in the tire side device 1, and the tire side device 1 can be more easily equipped to the predetermined portion of the tire 3.

Other Embodiments

In the foregoing embodiment, the integrated voltage value transmitted from the tire side device 1 is compared with the constant determination threshold in the vehicle side device 2 to estimate the road surface condition. Alternatively, the determination threshold may be a variable value. For example, the vibration generated in the tire 3 may be changed according to a vehicle speed, and the vibration generated in the tire 3 becomes larger as the vehicle speed increases even in the same road surface condition. For that reason, the high frequency component included in the detection signal of the vibration powered generation element 11 also becomes larger as the vehicle speed increases, and the integrated voltage value charged in the capacitor 183a also becomes larger. Therefore, for example, the vehicle speed data may be input to the road surface condition estimation unit 22, and the determination threshold can be changed to a larger value as the vehicle speed indicated by the vehicle speed data increases. The vehicle speed data calculated by a vehicle ECU (electronic control unit) on the basis of the detection signal from, for example, a vehicle speed sensor or a wheel speed sensor may be acquired through the CAN communication.

In the foregoing embodiment, the ground contact pulse detection unit 171 extracts the high frequency component of the detection signal of the vibration powered generation element 11 during a period of from the ground contact start time to the ground contact end time of the vibration powered generation element 11, that is, during the ground contact time. Then, the ground contact pulse detection unit 171 charges the capacitor 183a with the high frequency component to obtain the integrated voltage value. The above configuration describes is an example of the charging time period when obtaining the integrated voltage value. For another example, a constant time period immediately after the ground contact start of the vibration powered generation element 11 may be set as the charging time period for obtaining the integrated voltage value. For example, a time period assumed as the ground contact duration of the vibration powered generation element 11 when the vehicle travels at a speed of 60 km/h can be set as the charging time period. Suppose that the vehicle travels at a speed of 60 km/h or higher. In this case, the charging time period may include a period during which the vibration powered generation element 11 is not in contact with the ground. Although, the capacitor 183a is charged with the high frequency component of the detection signal of the vibration powered generation element 11 during the charging time period which includes a period during which the vibration powered generation element 11 is not in contact with the ground. Therefore, in this case, it is preferable to not perform the road surface condition estimation. That is, when the vehicle speed exceeds a predetermined speed under which the set charging time period is considered to be equal to the ground contact duration of the vibration powered generation element 11, the road surface condition estimation is not performed.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A road surface condition estimation device comprising:
   a tire side device; and
   a vehicle side device, wherein
   the tire side device includes:
      a vibration detection unit attached to a back surface of a tread of a tire provided to a vehicle and outputting a detection signal corresponding to a magnitude of a vibration of the tire;
      a signal processing unit including a ground contact duration extraction unit, a high frequency level calculation unit, a rotation number count unit, and a level correction unit, wherein
      the ground contact duration extraction unit extracts a ground contact duration during which a portion of the tread corresponding to an arrangement position of the vibration detection unit is in contact with a ground within one rotation cycle of the tire,
      the high frequency level calculation unit calculates a level of a high frequency component of the detection signal detected during the ground contact duration, wherein a high frequency is defined as a frequency higher than 1 kilohertz,
      the rotation number count unit counts a cumulative rotation number of the tire, wherein a correction coefficient used in a correction of the level of the high frequency component is set to decrease with an increase of the cumulative rotation number of the tire, and
      the level correction unit corrects the level of the high frequency component based on the cumulative rotation number of the tire; and
      a transmitter transmitting the level of the high frequency component which is corrected by the level correction unit as road surface condition data indicative of a road surface condition of a travelling road, and
   the vehicle side device includes:
      a receiver receiving the road surface condition data transmitted from the transmitter; and
      a road surface condition estimation unit estimating the road surface condition of the travelling road based on the road surface condition data.

2. The road surface condition estimation device according to claim 1, wherein
   the rotation number count unit counts a cumulative extraction number of the ground contact duration extracted by the ground contact duration extraction unit as the cumulative rotation number of the tire.

3. The road surface condition estimation device according to claim 1, wherein
   the ground contact section extraction unit detects a first peak value of the high frequency component generated when the portion of the tread corresponding to the arrangement position of the vibration detection unit contacts with the ground, or detects a second peak value of the high frequency component generated when the portion of the tread corresponding to the arrangement position of the vibration detection unit separates from the ground, and
   the rotation number count unit counts a cumulative number by which the first peak value is generated as the cumulative rotation number of the tire, or counts a cumulative number by which the second peak value is generated as the cumulative rotation number of the tire.

* * * * *